United States Patent
Okuyama et al.

(10) Patent No.: US 7,225,913 B2
(45) Date of Patent: Jun. 5, 2007

(54) DEVICE FOR DISCHARGE ROD-LIKE PRODUCT HAVING ONE END THAT IS LARGER SIZED

(75) Inventors: Toshio Okuyama, Tokushima (JP); Kazuhisa Kuwano, Tokushima (JP)

(73) Assignee: Fujirebio Inc., Tokyo (JP)

( * ) Notice: Subject to any disclaimer, the term of this patent is extended or adjusted under 35 U.S.C. 154(b) by 0 days.

(21) Appl. No.: 10/541,428

(22) PCT Filed: Dec. 11, 2003

(86) PCT No.: PCT/JP03/15909

§ 371 (c)(1),
(2), (4) Date: Jul. 5, 2005

(87) PCT Pub. No.: WO2004/060780

PCT Pub. Date: Jul. 22, 2004

(65) Prior Publication Data

US 2006/0108197 A1    May 25, 2006

(30) Foreign Application Priority Data

Jan. 6, 2003    (JP) .............................. 2003-000002

(51) Int. Cl.
| | |
|---|---|
| B65G 47/14 | (2006.01) |
| B65G 47/24 | (2006.01) |
| B65G 29/00 | (2006.01) |
| B65G 37/00 | (2006.01) |
| B65G 47/84 | (2006.01) |
| B65G 65/34 | (2006.01) |

(52) U.S. Cl. .................. 198/396; 198/466.1; 198/550.2
(58) Field of Classification Search ................ 198/396, 198/550.01, 550.2, 446, 443, 466.1; 221/236, 221/177

See application file for complete search history.

(56) References Cited

U.S. PATENT DOCUMENTS

| 2,977,022 A |   | 3/1961  | Vinson |
|---|---|---|---|
| 3,623,594 A | * | 11/1971 | Ravn et al. .................. 198/396 |

(Continued)

FOREIGN PATENT DOCUMENTS

| JP | 49-46156   | 5/1974 |
|---|---|---|
| JP | 58-34815   | 3/1983 |
| JP | 2000-19182 | 1/2000 |
| JP | 2001-187629 | 7/2001 |

*Primary Examiner*—Gene O. Crawford
*Assistant Examiner*—Ramya G. Prakasam
(74) *Attorney, Agent, or Firm*—Wenderoth, Lind & Ponack, L.L.P.

(57) ABSTRACT

A device for discharging rod-like products each having one end that is large sized. The device includes a hopper having an opening in its bottom surface, a drive mechanism for oscillating the hopper, and a bottom cover for closing the opening of the hopper. An upper surface of the bottom cover is shaped such that the cover closes the opening of the hopper so that the products do not drop from the opening. The bottom cover has a slit opened in the upper surface thereof, and the slit extends in a direction perpendicular to a direction of the oscillating motion. The slit has a width that allows all but a maximum size portion of the rod-like products to pass therethrough. The drive mechanism oscillates the hopper so that the rod-like products received in the hopper are guided to the slit of the bottom cover, arranged in the slit in order, and subsequently discharged from the slit.

12 Claims, 4 Drawing Sheets

U.S. PATENT DOCUMENTS

| | | | | |
|---|---|---|---|---|
| 4,034,456 A | * | 7/1977 | Bowers | 29/788 |
| 4,395,625 A | * | 7/1983 | Schutt | 235/98 C |
| 5,407,053 A | * | 4/1995 | Suzuki et al. | 198/347.1 |
| 5,522,493 A | * | 6/1996 | Spada et al. | 198/446 |
| 5,525,023 A | * | 6/1996 | Soga et al. | 414/414 |
| 5,934,505 A | * | 8/1999 | Shimada | 221/236 |
| 6,079,593 A | * | 6/2000 | Konrad | 221/299 |
| 6,334,527 B1 | * | 1/2002 | Kitamura | 198/704 |
| 6,405,895 B1 | * | 6/2002 | Kondo et al. | 221/236 |
| 6,432,719 B1 | * | 8/2002 | Vann et al. | 436/180 |
| 6,488,449 B1 | * | 12/2002 | Laquay et al. | 406/88 |

\* cited by examiner

DEVICE FOR DISCHARGE ROD-LIKE PRODUCT HAVING ONE END THAT IS LARGER SIZED

TECHNICAL FIELD

This invention relates to a device for arranging rod-like products in order, one end of each of which is larger sized, and discharging them, and particularly, to a discharge device optimal for arranging pipet tips in order and discharging them.

BACKGROUND ART

Pipet tips each in the shape of a rod-like product, one end of which is larger sized, are transported on a tray on which they are longitudinally and laterally arranged and take a vertically erect posture. The pipet tips are provided to an automatic tester in a state of being accommodated in the tray. Since the tray remains behind after the pipet tips are used, the tray has to be discarded. There has been a tremendously large quantity of pipet tips consumed in the entire country. Hence, trays have also been discarded in an extremely great quantity, which has resulted in high disposal expenses. This harmful influence of the disposal can be eliminated by adoption of a scheme in which pipet tips are not accommodated in a tray while taking a specific posture, but the pipet tips are transported, for example in bags or boxes and then set in a tester. When a tray is adopted, however, pipet tips are arranged in specific positions while taking a specific posture, which can allow a discharge mechanism with a simple construction for pipet tips in an automatic tester to be attained. On the other hand, pipet tips transported in bags or boxes are not arranged in a particular posture and position prior to setting them into an automatic tester leading to setting them therein in a non-controlled manner. Hence, the tester is required to take out each of the pipet tips in an individually particular posture fed into the tester in a non-controlled manner.

There has been developed a mechanism in which pipet tips, each taking a random posture, are taken out and arranged in a specific posture (see JP-A Nos. 2000-19182 and 2001-187629).

A discharge device for pipet tips described in JP-A No. 2000-19182 is constructed so that pipet tips fed at random are taken out individually by lifting up a single pipet tip at a time with a conveyor having a belt in an almost vertical posture and the separated pipet tip is dropped down and fed by the conveyor onto a slope. The slope is inclined at a downward gradient toward a slit and the pipet tip drops down into the slit. The slit is a clearance that prevents the flange of a pipet tip to pass therethrough. Therefore, a pipet tip is discharged from the slit while taking a posture in which the flange of the pipet tip is caught by the slit. The discharge device is complex in structure and high in manufacturing cost. An expensive discharge device can be employed as a device for feeding pipet tips fed at random into a tray. A complex, expensive mechanism is difficult to be adopted for a tester. This is because the number of testers are significantly more than the number of devices feeding pipet tips into trays. Therefore, a simple, inexpensive discharge device is required in order to omit a tray by installing a discharge device to a tester. Moreover, since, in this device, conventionally, a pipet tip is dropped down onto a slope, this device has a fault that a pipet tip can be damaged due to the shock.

A discharge device described in JP-A No. 2001-187629 is equipped with a rotary drum feeding pipet tips at random. The rotary drum has a scooping trough for pipet tips on the inner surface thereof. While the rotary drum is rotated, pipet tips are lifted up by the scooping trough and thereafter, dropped down from the scooping trough on slide rails. A pipet tip on the slide rails passes through a falling-down guide and then is dropped down at a determined position on the tray. The discharge device with this structure is also complex in structure and high in manufacturing cost. In addition, since a pipet tip is dropped, there has been a fault that a pipet tip can be easily damaged because of the shock.

The present invention has been made in order to solve the faults that the conventional discharge devices have had and it is an important object of the invention to provide a device for discharging a rod-like product one end of which is larger sized, such as a pipet tip, fed at random, capable of arranging rod-like products in a specific posture and discharging them with a extremely simple structure and at a reduced manufacturing cost.

It is another important object of the invention to provide a device for discharging a rod-like product, one end of which is larger sized, that is capable of arranging rod-like products fed at random in order and discharge them with reduction in shock and the consequent damage on the rod-like products.

SUMMARY OF THE INVENTION

The inventors have conducted serious studies in order to achieve the above objects, and these studies have resulted in completion of the invention. A discharge device according to a first aspect is directed to a device for discharging a rod-like product one end of which is larger sized, including a hopper not only swaying, but also having an opening portion, at the bottom surface thereof, extending in a direction of a rotation center axis of a swaying motion; a driving mechanisms swaying the hopper; and a bottom cover closing the opening portion of the swaying hopper so that rod-like products do not escape therefrom. The bottom cover has the upper surface closing the opening portion of the hopper profiled so as to be in conformity with a locus on which the opening portion of the swaying hopper moves and a slit extending in a direction perpendicular to a direction of the swaying motion so as to be open on the upper surface. The slit has a width that does not allow the maximum outer size portion of a rod-like product to pass therethrough, but lets almost all the rod-like product to pass therethrough. In the discharge device, the driving mechanism sways the hopper so that the opening portion of the hopper moves along the upper surface of the bottom cover to thereby guide rod-like products accommodated in the hopper into the slit of the bottom cover and to discharge the rod-like products from the slit being arranged in order therein.

A discharge device according to the second aspect of the invention vibrates the bottom cover to discharge the rod-like products guided into the slit.

In a discharge device according to the third aspect of the invention, rubber-like elastic bodies are fixed at the opening portion of the hopper so as to be close to the bottom cover.

In a discharge device according to the fourth aspect of the invention, a width of the rubber-like elastic bodies fixed at the opening portion of the hopper is defined to have a width in which the end edges thereof get close to the slit when the hopper is inclined. In a discharge device according to the fifth aspect of the invention, inclination plates, which are replacements for the rubber-like elastic bodies, are connected to the opening portion of the hopper. The inclination plates are connected so that the end edges thereof are close to the bottom cover. In a discharge device according to the sixth aspect of the invention, elastic bodies are connected to the inclination plates so that the end edges of the inclination plates get close to the bottom cover using the elastic bodies.

A discharge device according to the seventh aspect of the invention is equipped with a removal arm catching and pulling off a pipet tip, by the flange thereof, moved in a piled-up state, wherein rod-like products are pipet tips. A discharge device according to the eighth aspect of the invention is not only equipped with the removal arm, so as to be inclined relative to a fixing portion not swaying together with the hopper, but also has an inclination mechanism for inclining the removal arm constituted of permanent magnets fixed on the hopper and the removal arm at respective opposite portions thereof.

In a discharge device according to the ninth aspect of the invention, the bottom cover is provided with an upward inclined slit catching the flange of an pipet tip piled up on a pipet tip moved in the slit and raising the piled up pipet tip. The upward inclined slit is not only inclined at an upward gradient in a moving direction of the pipet tips, but the fore end of the removal arm is also provided to the upward inclined slit, thereby enabling the piled-up pipet tip moved along the upward inclined slit to be removed.

A taking device according to the tenth aspect of the invention has a clearance through which the flange of a rod-like product at the lowest level passes between the fore end of the upward inclined slit and the bottom cover and the clearance is narrower than twice a thickness of the flange of a rod-like product.

A discharge device of the invention is characterized in that rod-like products such as a pipet tip fed at random can be arranged in a specific posture and taken out with an extremely simple structure and a mechanism capable of reducing a manufacturing cost. This is because the talking-out device sways the hopper and guides the rod-like products into the slit in the bottom cover provided at the opening portion to take out the rod-like products through the slit.

A discharge device for a rod-like product of the invention with the above construction is further characterized in that rod-like products can be taken-out in arrangement with a specific posture with less of a shock and damage imposed on rod-like products.

DETAILED DESCRIPTION OF THE INVENTION

An embodiment of the invention based on the accompanying drawings will now be described. Examples shown below are, however, discharge devices in order to embody a technical concept of the invention presented by way of illustration and the invention does not specify a discharge device thereof to be any of the devices described below.

The specification attaches reference numbers indicating members shown in the examples to corresponding members recited in the claims and for understanding of the metes and bounds of claims. It should be understood, however, that the members recited in the claims are absolutely not to be construed as the particular members in the examples.

Detailed description will be given of a discharge device for a pipet tip used as a rod-like product, one end of which is larger sized, as an example of the invention. A discharge device of the invention can also arrange rod-like products, one end of which is larger sized, other than a pipet tip.

Figure 1:
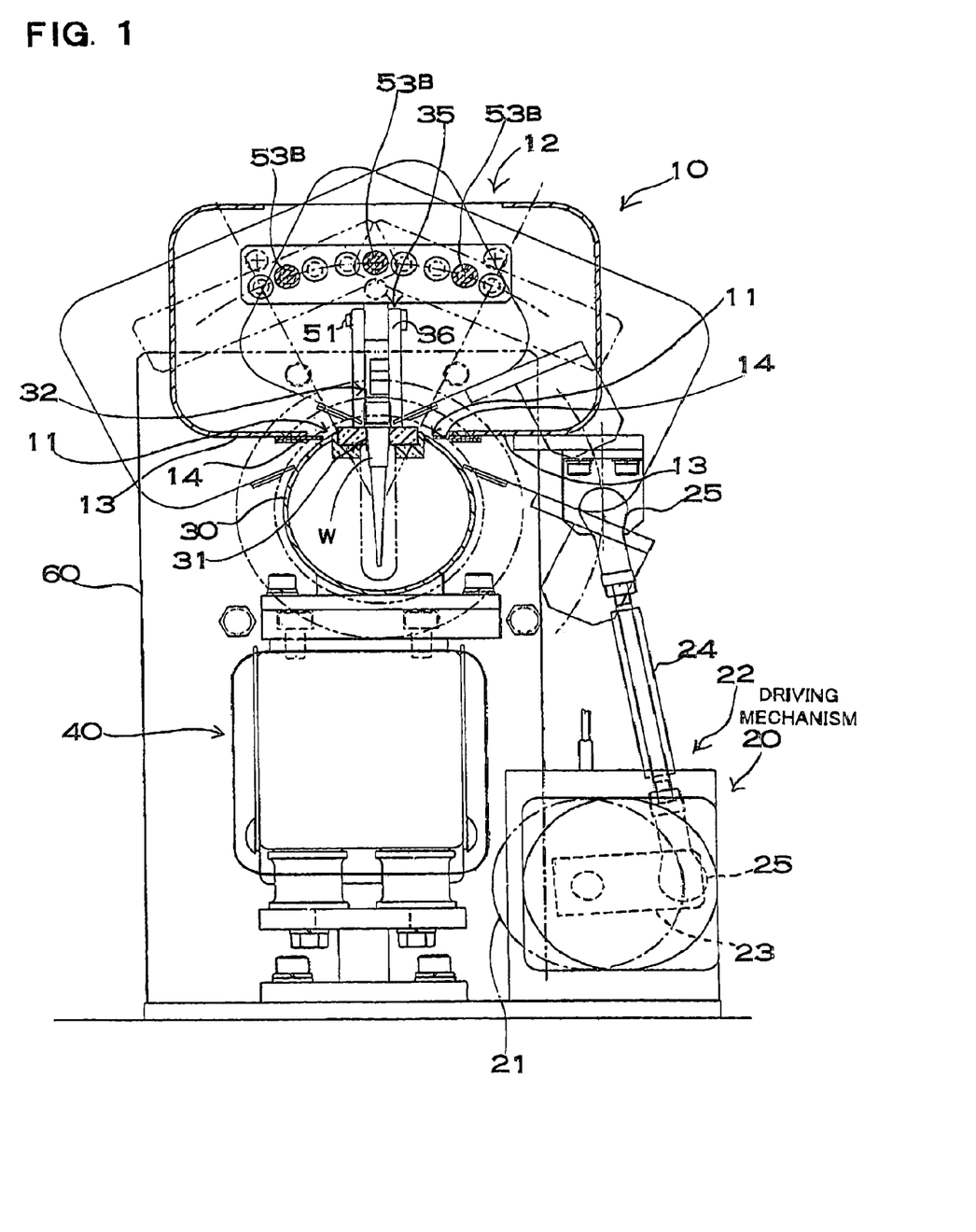
FIG. 1 is a cross-sectional view of a discharge device for a rod-like product related to one embodiment of the invention.
Figure 2:
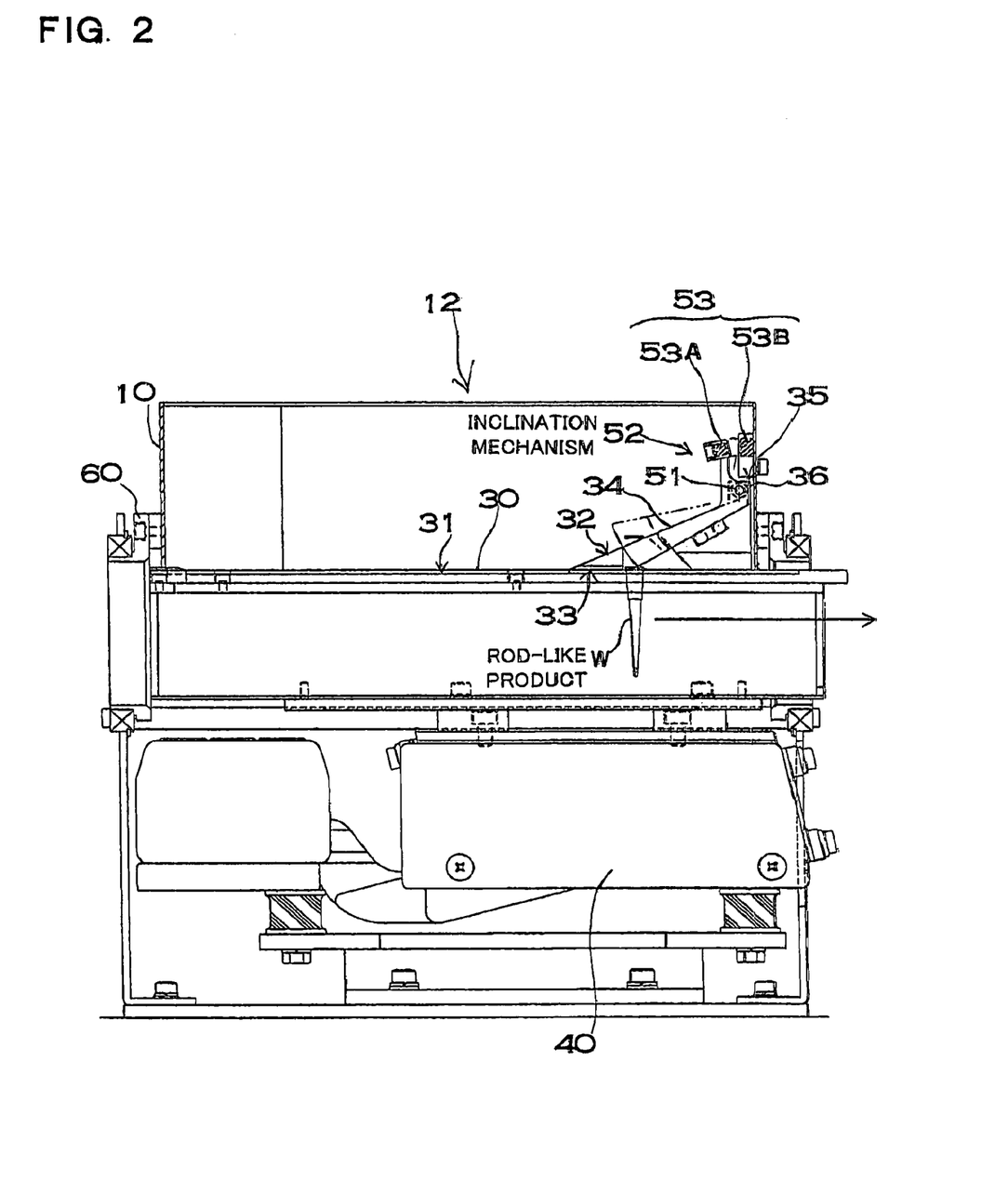
FIG. 2 is longitudinal sectional view of the discharge device for a rod-like product shown in FIG. 1.

A discharge device shown in FIGS. 1 and 2 includes; a hopper 10 having an opening portion 11 extending in a direction of a swaying rotation center axis at the bottom surface thereof; a driving mechanism 20 swaying the hopper 10; a bottom cover 30 closing the opening portion 11 of the swaying hopper 10; a transport mechanism 40 for transporting rod-like products S guided into a slit 31 of the bottom cover 30; and a removal arm 50 removing a rod-like products W in a piled-up state guided into the slit 31.

The hopper 10 has a supply port 12 through which rod-like products W are supplied. The supply port 12 is formed at the top of the hopper 10 and the opening portion 11 is closed by the bottom cover 30 at the bottom surface thereof. The hopper 10 of FIG. 1 has the opening portion 11 formed in the middle of a flat bottom plate 13. The hopper 10 having the flat bottom plate 13 can guide rod-like products W into the slit 31 while preventing bridging of the products W at the slit 31. The bottom plate can also be inclined toward the opening portion. The hopper 10 shown in the figure has a width of the opening portion 11 that is narrower than that of the whole the hopper 10. The hopper 10 can accommodate a greater quantity of rod-like products W and guide them into the slit 31 of the bottom cover 30. The hopper, however, can also have an opening portion extending all over the bottom. A width of the opening portion 11 provided in the hopper 10 is set so that a side edge of the opening portion 11 is in the vicinity of the slit 31 of the bottom cover 30 but does not close the slit 31 when the hopper 10 takes the most inclined posture. Therefore, the width adopts an optimal value taking into consideration the maximum inclination angle to which the hopper sways and a diameter of the bottom cover 30.

The maximum inclination angle of swaying hopper 10 is preferably about 30 degrees. The hopper, however, can also sway in the range of from 5 to 60 degrees and more preferably in the range of from 10 to 45 degrees as a maximum inclination angle. A sway cycle of the hopper 10 is preferably about 3 sec. The sway cycle, however, is also preferably in the range of 0.5 to 10 sec and more preferably in the range of from 1 to 5 sec. If a cycle of swaying the hopper 10 is increased, rod-like products W move more slowly in the hopper 10; therefore, damage to the rod-like product can be significantly reduced. If a cycle of the hopper 10 is excessively longer, it takes a longer time to guide a rod-like product W into the slit 31. Therefore, a cycle of swaying the hopper 10 is set to an optimal value taking into consideration the time to discharge a rod-like product W.

Figure 3:
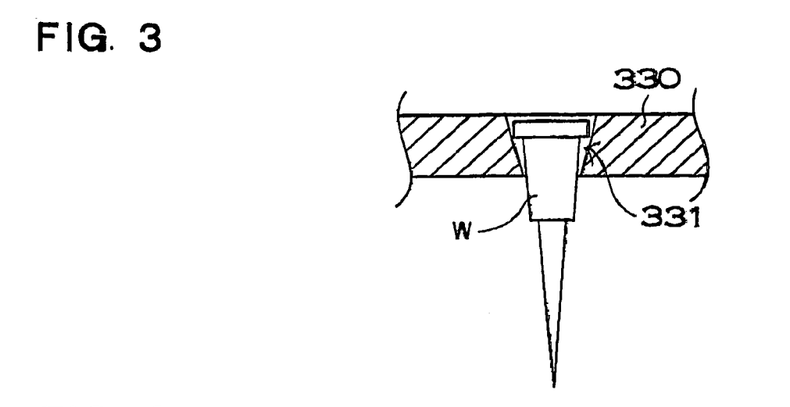
FIG. 3 is an enlarged sectional view showing another example of a slit.

The rod-like products W are guided into the slit 31 toward a direction of the slit 31 formed in the bottom cover 30 in the hopper 10. Since the maximum outer size is larger than a width of the slit 31, the maximum outer size portion (the flange in a case of a pipet tip) gets caught by the slit 31 and a rod-like product W is oriented in a vertical posture therein. A slit 331 is, as shown in FIG. 3, has a width that is gradually narrower downward and while the maximum outer size portion of a rod-like product W cannot pass therethrough, almost all the of rod-like product W can pass therethrough. In FIG. 3, reference numeral 330 indicates a bottom plate.

A length of the hopper 10 is more than that of a rod-like product W in order to be able to direct a rod-like product W in the direction of the slit 31. The hopper 10 is, so as to be swayable, connected to the bottom cover 30 or a frame 60 at one side or both sides thereof. Since the hopper, however, can also sway while being placed on the bottom cover, it is not necessarily required that the hopper 10 be connected to the bottom cover or the frame. Instead, the hopper can be swayed while being supported by a driving mechanism.

The opening portion 11 of the hopper 10 is closed by the bottom cover 30 in an inclined state of the hopper 10. In the hopper 10, rubber-like elastic bodies 14 are fixed at the opening portion 11 of the hopper 10 so as be close to the bottom cover 30. Not only can the hopper 10 be inclined so that the end edge of the opening portion 11 gets close to the bottom cover 30 without a clearance, but the opening portion can also slide smoothly on the surface of the bottom cover 30 with less wear. The rubber-like elastic bodies 14 are preferably fixed so as to be exchangeable. The rubber-like elastic bodies 14 can prevent a clearance between the opening portion 11 and the bottom cover 30 from being generated by exchanging the rubber-like elastic bodies 14 if worn.

The bottom cover 30 closes the opening portion 11 so that rod-like products W do not escape from the opening portion 11 of the swaying hopper 10. Since the hopper 10 sways, a profile of the upper surface of the bottom cover 30 is in conformity with a locus on which the opening portion 11 of the swaying hopper 10 moves and thereby, rod-like products W, even if the hopper 10 sways, do not escape between the opening portion 11 and the bottom cover 30. Since the discharge device sways the hopper 10 along a locus of a circular arc, a profile of the upper surface of the bottom cover 30 is shaped in conformity with a circular arc. The bottom cover can also take a profile along an ellipse on the upper surface thereof to close the opening portion of the swaying hopper. A discharge device with the bottom cover 30 having a profile of the upper surface in conformity with a circle or an ellipse can move smoothly on the opening portion 11 of the hopper 10. Especially, the hopper 10 having the opening portion 11 attached with the rubber-like elastic bodies 14 can move the rubber-like elastic bodies 14 smoothly on the upper surface of the bottom cover 30 by sliding thereon. The bottom cover can also take a profile of the upper surface in conformity with a polygon so that the opening portion 11 of the swaying hopper is closed without rod-like products being escaped from the opening portion 11. The bottom cover with the upper surface having a profile in conformity with a polygon changes the width of a clearance between the opening portion and the bottom cover while the hopper sways. Only if the maximum clearance between the opening and the bottom cover is reduced to a width at which no escape of rod-like products occurs, the hopper can sway so that no rod-like product escapes from a clearance. In addition, a construction is also possible in which rubber-like elastic bodies at the opening of the hopper are fixed and the rubber-like elastic bodies are deformed to thereby close a clearance between the opening portion and the bottom cover.

Narrow, long rod-like products are, in a case, brought into a state of being caught by one another in the vicinity of the slit, that is, a jamming state. Jamming of rod-like products can be eliminated by increasing the width of the plate-like rubber-like elastic bodies. Rubber-like elastic bodies realizing no jamming have a width at which the end edge of the rubber-like elastic bodies get close to the slit when the hopper is inclined at the maximum inclination angle. The end edges of the rubber-like elastic bodies move as far as points in the vicinity of the slit each time the hopper is inclined. The rubber-like elastic bodies moving as far as points in the vicinity of the slit move rod-like products in a state of being caught by one another with the end edges thereof to eliminate the jamming. Rubber-like elastic bodies realizing no jamming locate the end edges thereof in the inside of the slit, at the side edges thereof or outside thereof when the hopper is in the maximum inclination state. Rubber-like elastic bodies, the end edges of which are moved in the inside of the slit or outside thereof when the hopper is in the maximum inclination state, push the flanges of rod-like products guided in a posture vertical relative to the slit. Therefore, the rubber-like elastic bodies push the flanges of the rod-like products guided into the slit and elastically deform. Rubber-like elastic bodies with this structure can effectively eliminate jamming of rod-like products in the vicinity of the slit. Rubber-like elastic bodies the end edges of which are located outside of the slit when the hopper is at the maximum inclination position do not push the flanges of rod-like products guided into the slit. Hence, the rubber-like elastic bodies do not push the flanges of rod-like products normally guided into the slit and move only rod-like products in a jammed state in the vicinity of the slit to eliminate jamming. Hence, elastic bodies with this structure are characterized in that rod-like products guided into the slit can be smoothly moved. Since the end edges of rubber-like elastic bodies, located outside of the slit when the hopper is in the maximum inclination state also have an opportunity to lightly push the flanges of rod-like products guided into the slit, the rubber-like elastic bodies deform by pushing the flanges thereof.

Figure 4:
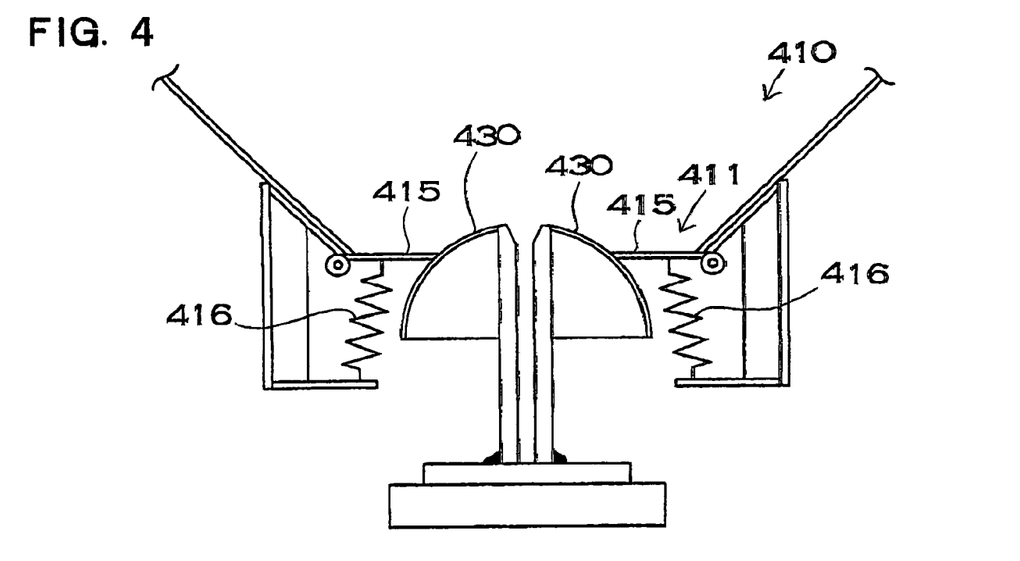
FIG. 4 is a sectional view showing another example of a hopper.

A hopper, as shown in FIG. 4, can also be connected to inclination plates 415 instead of rubber-like elastic bodies. The inclination plates 415 are connected to an opening portion 411 of the hopper 410 so as to be able to be inclined. The end edges of the inclination plates 415 are located close to a bottom cover 430 to seal the hopper 410 so that rod-like products do not escape from the swaying hopper 410. The inclination plate 415 forces the fore end thereof to get close to the bottom cover 430 by the weight thereof. Elastic bodies 416 are, as shown in the figure, connected to the inclination plates 415 and the end edges of the inclination plates 415 can also cause the plates to get close to the bottom cover 430.

The bottom cover 30 has the slit 31 extending in a direction perpendicular to a direction of a swaying motion of the hopper 10. The slit 31 is provided so as to be open on the upper surface of the bottom cover 30. The slit 31 has a width that does not allow the maximum outer size portion of a rod-like product W to pass, but passes almost all of the rod-like piece W, which is the part other than the maximum outer size portion. This is because a rod-like product W is put into the slit 31 and moved along the slit 31 in a vertical posture while the flange thereof, which is the maximum outer size portion, is caught by the upper surface of the slit 31 and discharged. The slit 31 extends as far as the end portions of the bottom cover 30. This is because a rod-like product W guided into an end portion is discharged to the outside of the bottom cover 30. Rod-like products W are discharged through the slit 31 in a vertical posture. Therefore, the slit 31 is formed in the bottom cover 30 so as to be open in a vertical direction. Since the slit can also discharge rod-like products in a slightly inclined posture, a vertical posture is not necessarily required and instead an inclined posture can also be adopted. Pipet tips, which are rod-like products W, each have a flange provided as the maximum outer size portion. Therefore, the slit 31 has a width such that while a flange cannot pass through the slit 31, the portion other than the flange can pass therethrough. Rod-like products moved into the slit are not necessarily required to have a shape with a flange and, for example, it can also have one end thereof as the maximum outer size portion in the shape of a cone or a pyramid.

The driving mechanism 20 sways the hopper 10. The driving mechanism 20 includes: a crank mechanism 22 rotated by a motor 21; and a connecting rod 24 connected to a crank arm 23 of the crank mechanism 22. The lower end of the connecting rod 24 is connected to the crank arm 23, while the upper end thereof is connected to one side of the hopper 10 through respective spherical joints 25. When the motor 21 rotates the crank arm 23, the connecting rod 24 reciprocates to sway the hopper 10. The driving mechanism 20 can sway the hopper 10 with a simple mechanism. A discharge device of the invention does not specifically limit a driving mechanism swaying the hopper to the mechanism shown in the figure and any of all mechanisms capable of swaying the hopper; for example a shrinkable cylinder can be connected to the hopper to sway the hopper by stretching or shrinking the cylinder.

The transport mechanism 40 discharges rod-like products W guided into the slit 31 of the bottom cover 30 along the slit 31. The transport mechanism 40 in the figure is a vibrator for vibrating the bottom cover 30. The vibrator vibrates the bottom cover 30 so as to move rod-like products W along the slit 31. The vibrator can move rod-like products W along the slit 31 with an extremely simple structure. The transport mechanism is not specifically limited to a mechanism vibrating the bottom cover. Any of mechanisms capable of discharging rod-like products in the slit: for example, a structure jetting air to rod-like products in the slit to thereby move them, a structure in which the bottom cover is inclined in a moving direction of the rod-like products, a structure having a conveyor on inner faces of the slit, or the like can be used.

Rod-like products W such as pipet tips each having a cavity inside thereof are, in some cases, piled up at plural levels. This is because a rod-like product W can be inserted into the cavity inside another of the rod-like products W and thereby piling up occurs. In order to discharge rod-like products W through the slit 31 by separating the rod-like products W into a single independent one, the discharge device in the figure is equipped with: a removal arm 50, capable of removing a rod-like product moved in a piled-up state; and an upward inclined slit 32.

Figure 5:
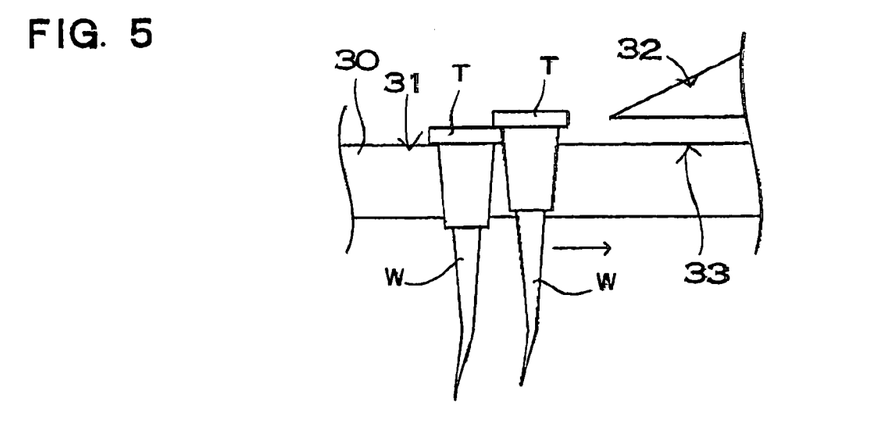
FIG. 5 is an enlarged sectional view showing a state where rod-like products with two flanges piled up at two levels are moved.

The upward inclined slit 32 allows a rod-like product W at the lowest level of movement along the slit 31 to pass thereunder without raising the rod-like product W at the lowest level but raises a rod-like product W that is moved in a piled up state relative to the rod-like product W at the lowest level. The maximum outer size portion of the rod-like products W piled up on the rod-like product W at the lowest level moves in a position that is higher than the maximum outer size portion of the rod-like product W at the lowest level. The upward inclined slit 32 has a clearance 33 between the fore end thereof and the bottom cover 30, through which the maximum outer size portion of the rod-like product W at the lowest level can pass. The clearance 33 is a clearance through which only the maximum outer size portion of the rod-like product W at the lowest level can pass. The clearance 33 is narrower than twice a thickness of the flange T of a rod-like product W. The upward inclined slit 32 with a clearance 33 having this width can, as shown in FIG. 5, prevent a rod-like product W piled up on the flange of the rod-like product W of interest from passing therethrough. This is because the clearance 33 does not allow a flange T that is piled up on the other to pass therethrough. The maximum outer size portion of a rod-like product W moved in a state of being piled up on a rod-like product W at the lowest level is gradually raised along the upward inclined slit 32 as it moves. Hence, the fore end of the upward inclined slit 32 is located lower than the maximum outer size portion of a rod-like product W moved in a state of being piled up on a rod-like produce W at the lowest level. The upward inclined slit 32 has a width that is narrower than the maximum outer size portion of a rod-like product W so as to be able to catch and raise the maximum outer size portion of the rod-like product W, wherein the width is able to pass almost all of the portion other than the maximum outer size portion therethrough. The upward inclined slit 32 is inclined at an upward gradient in a moving direction of a rod-like product W.

Figure 6:
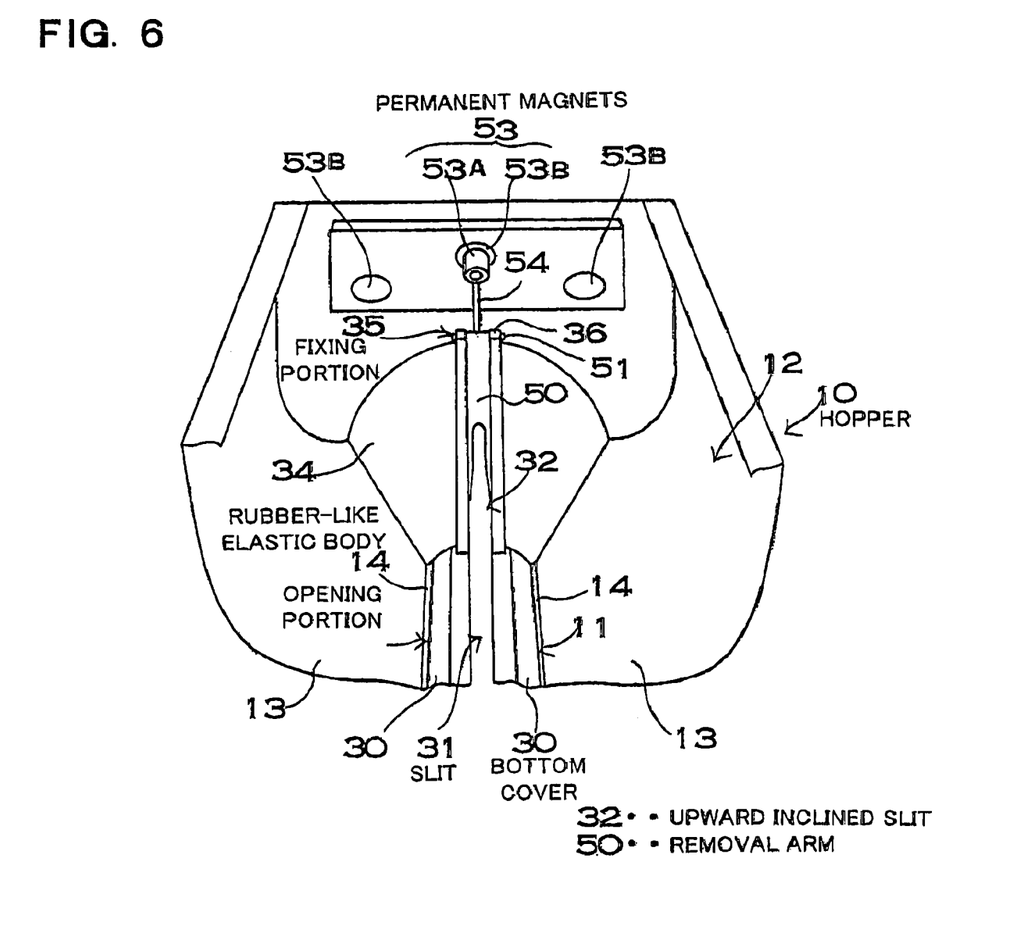
FIG. 6 is a perspective view showing the vicinity of an upward inclined slit of the discharge device for a rod-like product shown in FIG. 1.

FIG. 6 is a perspective view showing the vicinity of the upward inclined slit 32 of the discharge device. In the discharge device of the figure, conical covers 34 are fixed on both sides of the upward inclined slit 32. The opening portion 11 of the hopper 10 is gradually larger in width toward one end thereof so as to pass through the conical covers 34. A discharge device having the conical covers 34 can eliminate jamming of rod-like products W between the upward inclined slit 32 and the hopper 10.

The upward inclined slit 32 is equipped with the fore end of a removal arm 50 at a position part way along. The removal arm 50 lifts up a rod-like product W moved along the upward inclined slit 32 to remove the lifted-up rod-like product W from a rod-like product at the lowest level. That is, the removal arm 50 pulls off the rod-like product W from the rod-like product W at the lowest level by catching the flange, which is the maximum outer portion of a pipet tip as a rod-like product W. The discharge device having the upward inclined slit 32 and the removal arm 50 discharges only the rod-like product W at the lowest level, which is already free from a piled-up state. A rod-like product W piled up on the other can also be removed only with the removal arm without using the upward inclined slit. The removal arm locates the fore ends thereof at its lowest position so as to be lower than the flange, which is the maximum outer portion of the rod-like product moved in a state of being piled up on the rod-like product at the lowest level.

The removal arm 50 is installed so as to be inclined relative to a fixed portion 35, which does not sway together with the hopper 10. The removal arm 50 in the figure is connected to the bottom cover 30 as a fixed portion so as to be inclined relative thereto. In order to fix the removal arm 50, a support pole 36 extending vertically is fixed to the bottom cover 30 and the removal arm 50 is connected to the support pole 36 so as to be inclinable in a vertical plane. The removal arm 50 is connected to the support pole 36 with a rotary shaft 51 interposed therebetween so as to be inclinable in the vertical plane including the slit 31. The removal arm 50 is inclined by an inclination mechanism 52 to pull off a rod-like product W moved in a piled-up state.

The inclination mechanism 52, shown in FIG. 6, has permanent magnets 53 fixed to the respective opposite portions of the hopper 10 and the removal arm 50. A driving arm 54 extends upward from a portion of the removal arm 50 which is connected to the support pole 36 and a first permanent magnet 53A is fixed to the driving arm 54. In addition, a second permanent magnet 53B is fixed at a position opposite to the first permanent magnet 53A on the hopper 10 while the hopper 10 sways. The inclination mechanism 52, while the hopper 10 sways, repeats motions in which one of second permanent magnets 53B gets close to the first permanent magnet 53A or gets far away from it. The first permanent magnet 53A and a second permanent magnet 53B are facing each other, with an N pole of the former and an S pole of the latter at respective opposite faces, or vice versa. The second permanent magnets 53B are, as shown in FIG. 1, dotted on a locus in which the first permanent magnet 53A moves. Hence, when a second permanent magnet 53B gets close to the first permanent magnet 53A in a swing motion of the hopper 10, the fore end of the removal arm 50 is inclined so as to lift up the fore end thereof. When a second permanent magnet 53B gets far way from the first permanent magnet 53A in a swaying motion of the hopper 10, the fore end of the removal arm 50 is inclined so as to move down the fore end thereof by the weight of itself. In addition, in a case where, though not shown, the second permanent magnets each having the same polarity as the first permanent magnet on respective opposite faces are arranged at positions on a line opposite a locus of the motion of the first permanent magnet, the removal arm can be quickly inclined so as to move down the fore end thereof by a repelling force from a second permanent magnet. The inclination mechanism moves the fore end upward when the first permanent magnet passes by a second permanent magnet with a polarity different from that of the first permanent magnet, while moving downward the fore end downward when the first permanent magnet passes by a second permanent magnet with the same polarity as the first permanent magnet. That is, the removal arm can be quickly inclined by a magnetically attracting force and a magnetically repelling force between the permanent magnets. The inclination mechanism for inclining the removal arm by a magnetic force between permanent magnets can incline the removal arm with an extremely simple structure.

Figure 7:
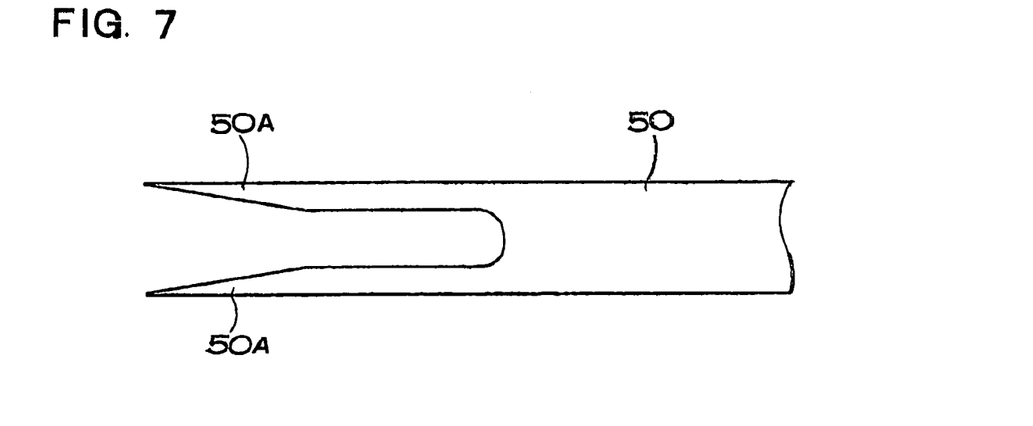
FIG. 7 is an enlarged plan view of fore end portion of a removal arm.

The removal arm 50 to be inclined by a magnetic force can be inclined so as to move the fore end thereof upward to catch a rod-like product W piled up on a rod-like product W at the lowest level and to pull off the rod-like product W in a piled up state from the other. The removal arm 50, as shown in FIG. 7, has a pair of catching tips 50A at the fore end thereof so as to be able to catch a rod-like product W moved in a piled-up state by inclining itself to thereby pull off the rod-like product W. A separation width of the catching pieces 50A is narrower than the maximum outer size portion of a rod-like product W, while being almost equal to the width of the upward inclined slit 32 at which almost all of the portion other than the maximum outer size portion can pass through.

The removal arm 50 at the lowest position is located inside of the upward inclined slit 32, that is, lower than the upward inclined slit 32. The removal arm 50 moves upward so as to be able to catch a rod-like product W moved in the upward inclined slit 32 and to thereby remove the rod-like product W and thereby, remove the rod-like product W from a rod-like product W at the lowest level. Hence, the fore end of the removal arm 50 does not catch the rod-like product W at the lowest level in the slit 31 but is located at a position at which the fore end thereof catches a rod-like product W moved in a piled-up state on a rod-like product W at the lowest level. As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on application No. 2003-000002 filed in Japan on Jan. 6, 2003, the content of which is incorporated hereinto by reference.

The discharge device of the invention can feed rod-like products each having a flange at one end such as a pipet tip used in analysis of blood, one end of which is larger sized in random posture without being orderly arranged in a tray or the like, and can take out the rod-like products in a desired orientation.

The invention claimed is:

1. A discharge device for discharging elongated products each having one end that is larger in size than the other end, the discharge device comprising:
    a hopper having an opening portion at a bottom portion thereof;
    a driving mechanism for swaying the hopper about a rotation center axis, wherein the opening portion of the hopper extends in a direction of the rotation center axis; and
    a bottom cover closing the opening portion of the hopper so that elongated products do not escape therefrom, wherein
    the bottom cover has an upper surface closing the opening portion of the hopper and a slit extending in a direction perpendicular to a direction of the swaying motion of the hopper so as to be open in the upper surface,
    the bottom cover is profiled so that the elongated products cannot escape from the opening portion of the hopper,
    the slit has a width that allows all but the maximum outer size portion of the elongated products to pass therethrough, and
    the driving mechanism is operable to sway the hopper so that the opening portion of the hopper moves along the upper surface of the bottom cover to thereby guide the elongated products, accommodated in the hopper, into the slit of the bottom cover,
    wherein the swaying motion of the hopper defines a sway cycle in the range of 0.5 to 10 sec.

2. The discharge device according to claim 1, further comprising a vibrator for vibrating the bottom cover, wherein the bottom cover is vibrated to discharge the elongated products from the slit.

3. The discharge device according to claim 1, wherein the upper surface of the bottom cover takes a profile in conformity with a circular arc so that the elongated products do not escape from the opening portion of the hopper.

4. The discharge device according to claim 1, wherein the hopper has a flat bottom plate.

5. The discharge device according to claim 1, wherein the hopper has a bottom plate that is inclined toward the opening portion.

6. The discharge device according to claim 1, wherein the opening portion of the hopper has a width that is narrower than a bottom portion of the hopper.

7. The discharge device according to claim 1, wherein the swaying motion of the hopper has a maximum inclination angle in the range of from 5 to 60 degrees.

8. The discharge device according to claim 1, further comprising elastic bodies fixed at the opening portion of the hopper so as to be close to the bottom cover.

9. The discharge device according to claim 1, further comprising elastic bodies fixed at the opening portion of the hopper and each of the elastic bodies has a width so that end edges thereof are close to the slit when the hopper is inclined.

10. A discharge device for discharging elongated products each having one end that is larger in size than the other end, the discharge device comprising:
- a hopper having an opening portion at a bottom portion thereof;
- a driving mechanism for swaying the hopper about a rotation center axis, wherein the opening portion of the hopper extends in a direction of the rotation center axis; and
- a bottom cover closing the opening portion of the hopper so that elongated products do not escape therefrom, wherein
- the bottom cover has an upper surface closing the opening portion of the hopper and a slit extending in a direction perpendicular to a direction of the swaying motion of the hopper so as to be open in the upper surface,
- the bottom cover is profiled so that the elongated products cannot escape from the opening portion of the hopper,
- the slit has a width that allows all but the maximum outer size portion of the elongated products to pass therethrough, and
- the driving mechanism is operable to sway the hopper so that the opening portion of the hopper moves along the upper surface of the bottom cover to thereby guide the elongated products, accommodated in the hopper, into the slit of the bottom cover.
- wherein the elongated products are pipet tips and each of the pipet tips includes a flange,
- the discharge device further comprising a removal arm for catching and pulling off one of the pipet tips from the slit, the removal arm being operable to engage the flange of the pipet tip when stacked on a lower one of the pipet tips, and
- an inclination mechanism for inclining the removal arm, wherein the inclination mechanism includes permanent magnets fixed to opposing portions of the hopper and the removal arm.

11. The discharge device according to claim 10, wherein the bottom cover forms an upward inclined slit for catching the flange of a pipet tip stacked on a lower pipet tip in the slit of the bottom cover and raising the stacked pipet tip,
- wherein the upward inclined slit is inclined at an upward gradient in a moving direction of the pipet tips, and a front end of the removal arm is provided at the upward inclined slit, and thereby the removal arm is capable of removing the stacked pipet tip as it is moved along the upward inclined slit.

12. A discharge device for discharging elongated products each having one end that is larger in size than the other end, the discharge device comprising:
- a hopper having an opening portion at a bottom portion thereof;
- a driving mechanism for swaying the hopper about a rotation center axis, wherein the opening portion of the hopper extends in a direction of the rotation center axis; and
- a bottom cover closing the opening portion of the hopper so that elongated products do not escape therefrom, wherein
- the bottom cover has an upper surface closing the opening portion of the hopper and a slit extending in a direction perpendicular to a direction of the swaying motion of the hopper so as to be open in the upper surface,
- the bottom cover is profiled so that the elongated products cannot escape from the opening portion of the hopper,
- the slit has a width that allows all but the maximum outer size portion of the elongated products to pass therethrough, and
- the driving mechanism is operable to sway the hopper so that the opening portion of the hopper moves along the upper surface of the bottom cover to thereby guide the elongated products, accommodated in the hopper, into the slit of the bottom cover,
- wherein the elongated products are pipet tips and each of the pipet tips includes a flange,
- the discharge device further comprising a removal arm for catching and pulling off one of the pipet tips from the slit, the removal arm being operable to engage the flange of the pipet tip when stacked on a lower one of the pipet tips,
- wherein the bottom cover forms an upward inclined slit capable of catching the flange of a pipet tip that is stacked on another pipet tip while being moved in the slit of the bottom cover and raising the stacked pipet tip,
- wherein the upward inclined slit is inclined at an upward gradient in a moving direction of the pipet tips, and a fore end of the removal arm is provided at the upward inclined slit, and thereby the removal arm is capable of removing the stacked pipet tip as it is moved along the upward inclined slit,
- wherein the upward inclined slit forms a clearance through which the flange of a pipet tip, at the lowest level, can pass between a front end of the upward inclined slit and the bottom cover, the clearance being narrower than twice a thickness of the flange of the pipet tip.

* * * * *